United States Patent [19]

Bruckenstein

[11] 4,145,282

[45] Mar. 20, 1979

[54] PROCESS FOR PURIFYING WASTE WATER CONTAINING FLUORIDE ION

[75] Inventor: Stanley Bruckenstein, Williamsville, N.Y.

[73] Assignee: Andco Industries, Inc., Cheektowaga, N.Y.

[21] Appl. No.: 761,685

[22] Filed: Jan. 24, 1977

[51] Int. Cl.$^2$ .............................................. C02B 1/20
[52] U.S. Cl. ........................................ 210/46; 210/47; 210/53; 210/DIG. 32; 423/163
[58] Field of Search .................. 210/42 R, 45, 46, 47, 210/49, 51, 52, 53, 60, 59, DIG. 32; 423/158, 163, 301, 319–321, 166, 464

[56] References Cited

U.S. PATENT DOCUMENTS

| | | | |
|---|---|---|---|
| 2,380,800 | 7/1945 | Smith et al. | 210/45 |
| 3,284,350 | 11/1966 | Williamson | 210/46 |
| 3,467,496 | 9/1969 | English et al. | 423/320 |
| 3,552,918 | 1/1971 | Fitch et al. | 423/320 |
| 4,028,237 | 6/1977 | Nishimura et al. | 210/45 |

FOREIGN PATENT DOCUMENTS 47-43574 11/1972 Japan ............................. 210/DIG. 32

OTHER PUBLICATIONS

Van Wazer J. R.; "Phosphorus and its Compounds" vol. I; Interscience Publishers Inc. 1961, p. 522.
Rabosky J. G. et al., "Fluoride Removal by Lime Precipitation and Alum and Polyelectrolyte Coagulation"; Proc. of the 29th Ind. Waste Conf. pp. 669–676 (1974).

*Primary Examiner*—Charles N. Hart
*Assistant Examiner*—Benoit Castel
*Attorney, Agent, or Firm*—Christel, Bean & Linihan

[57] ABSTRACT

A process for purifying waste water containing fluoride which comprises precipitating fluoride from the waste water as fluorapatite. Fluoride is removed as fluorapatite by having sufficient available calcium for each mole of fluoride present in the waste water and sufficient available phosphate for each mole of fluoride in the waste water to form a precipitate which is or converts to sufficient fluorapatite to remove essentially all fluoride from the waste water.

37 Claims, No Drawings

PROCESS FOR PURIFYING WASTE WATER CONTAINING FLUORIDE ION

BACKGROUND OF THE INVENTION (a) Field of the Invention

This invention relates to the removal of fluoride from waste water and more particularly relates to its removal as a water insoluble precipitate.

(b) History of the Prior Art

Many industrial processes including those processes for the manufacture of phosphates, fluoborates, fluorides, fluorine, and fluorosilicate have large quantities of waste water which contain fluoride. For the protection of the environment, it is necessary to remove fluoride ion from the waste water prior to its discharge. Governmental regulations presently provide for limitations on the discharge of fluorides to the environment and generally require that the best available technology be used to remove as much fluoride as possible prior to its discharge.

In the prior art, methods have been developed for removing fluorides from waste water. None of these processes for removing fluorides have been completely successful since even the best of the commercially feasible processes result in the waste water continuing to contain at least about 4 parts per million and usually in excess of 10 parts per million of fluoride.

Generally, the prior art processes precipitated fluoride contained in the waste waters as calcium fluoride. Such precipitation usually did not result in the removal of sufficient fluoride to drop the fluoride concentration in the waste water below 8 parts per million. When, subsequent to initial removal of calcium fluoride, large quantities of calcium compounds were added to the waste water, for example in the form of lime, additional precipitate would form which would drop the fluoride concentration to as low as about 4 parts per million if long holding times were used.

No commercially feasible prior art process however, removed sufficient fluoride from the waste water to drop the fluoride concentration to below about 3 parts per million. A lower concentration of fluoride in discharged waste water is desirable for better protection of the environment.

The ocean has been able over long periods of time to free itself from many soluble fluorides and presently contains about 1.4 parts per million of soluble fluoride. The ocean has been able to remove fluorides in the form of water insoluble calcium salts, some of which have converted to highly insoluble fluorapatite. However, since 3 moles of phosphate are required for each mole of fluoride to form fluorapatite and since the ocean contains less than about 0.1 parts per million water soluble phosphate, the ocean is unable to remove the remaining soluble fluorides as fluorapatite.

BRIEF DESCRIPTION OF THE INVENTION

The invention is a process for purifying waste water which contains fluoride by precipitating fluorides from the water. In accordance with the invention the waste water is provided with sufficient available calcium and sufficient available phosphate to form a fluorine containing precipitate which removes essentially all fluoride from the waste water. Desirably, but not essentially, the precipitate is separated from the waste water within about 4 hours and preferably within about 2 hours after essentially all of the fluoride is precipitated.

In accordance with the process of the invention, calcium composition and phosphate composition are added to the water to provide the sufficient available calcium and phosphate. The sufficient available phosphate and sufficient available calcium may be added simultaneously or separately. The phosphate and calcium compositions may be added during preceding independent processes while the water is being used, or may be added after preceding independent processes have finished utilizing the water. Usually, but not necessarily, the sufficient available calcium is incorporated into the waste water before the incorporation of the available phosphate.

DETAILED DESCRIPTION OF THE INVENTION

The invention is a process for purifying waste water which contains fluoride. In accordance with the invention, the fluoride is precipitated from the waste water through chemical reaction with sufficient available phosphate and sufficient available calcium to remove all essentially all fluoride from the water. If the water already contains sufficient phosphate or calcium, additional phosphate or calcium need not be added. For example, if the water already contains sufficient available calcium, e.g. usually at least three and preferrably at least 5 moles per mole of fluoride, additional calcium need not be added and in accordance with the invention it is only necessary to add sufficient available phosphate.

Sufficient acid is added to the water prior to or simultaneously with the adding of either the calcium or phosphate to obtain a pH below about 11.5 after both the calcium and phosphate are added.

Sufficient base is added after the addition of calcium, phosphate and the sufficient acid to obtain a sufficiently high pH to cause the formation of a precipitate. The resulting precipitate is then maintained in contact with the waste water until essentially all fluoride is removed from the water.

"Available calcium" as used herein means calcium which is in solution or is otherwise available to react with fluoride and available phosphate to form fluorapatite. "Sufficient available calcium" means that amount of available calcium which in conjunction with available phosphate is required to precipitate essentially all of the fluoride and is usually at least 3 moles of calcium per mole of fluoride present in the waste water.

"Available phosphate" as used herein means phosphate ion or a water soluble phosphate composition having a phosphate radical available to react with fluoride to form fluorapatite. "Sufficient available phosphate" means that amount of available phosphate which in conjunction with the available calcium is required to precipitate essentially all of the fluoride and is usually at least 1 mole per mole of fluoride in the waste water.

"Fluoride" as used herein means fluorine in any form which will react with calcium ion and phosphate ion in water to form fluorapatite either directly or through intermediate compositions. The fluoride is usually in the form of fluoride ion.

Waste water containing fluoride is purified before it is discharged to the environment by removing fluoride. "Purifying", as used herein, means that essentially all fluoride is removed from the waste water. "Essentially all" is intended to mean that less than three parts per million of fluoride remains in the purified water; however, by this process, waste water can be readily obtained containing less than 0.5 parts per million (ppm) fluoride and under proper conditions, less than 0.1 parts per million fluoride. Purified waste water has even been obtained by this process which contains less than 0.005 parts per million fluoride.

In accordance with the process of the invention, waste water is purified by removing fluoride in the form of a precipitate. At least some of the precipitate is believed to be fluorapatite which is a water insoluble fluoride composition containing calcium and phosphate groups and is believed to have the formula: $Ca_5(PO_4)_3F$.

Fluorapatite, as can be seen from the above formula, is believed to have a mole ratio of 5 moles of calcium to 3 moles of phosphate to 1 mole of fluorine and its formation may be represented by equation 1.

EQUATION 1

$$5Ca^{+2} + 3PO_4^{-3} + F^- \rightarrow Ca_5(PO_4)_3F \downarrow$$

Equation 1 above, while representing the overall formation of fluorapatite from calcium, phosphate and fluoride, does not necessarily require that the fluorapatite be formed by the direct interaction of the ions. In some cases it is believed that intermediate compounds or species may be formed which subsequently convert to the fluorapatite.

A few of such intermediate compounds which are believed to be formed when calcium, phosphate, fluoride ions are present in aqueous solution are:

Whitlockite or beta calcium phosphate having the formula $\beta Ca_3(PO_4)_2$;

Octacalcium phosphate having the formula $Ca_8H_2(PO_4)_6 \cdot 5H_2O$;

Brushite having the formula $CaHPO_4 \cdot 2 H_2O$, and

Monetite having the formula $CaHPO_4$.

In addition, it is believed that fluorapatite may be formed by conversion from amorphous calcium phosphates in the presence of fluoride.

In order to precipitate essentially all of the fluoride present in the waste water as fluorapatite, at least five moles of available calcium and three moles of available phosphate must be present in the waste water for each mole of fluoride. The presence of these appropriate amounts of calcium and phosphate are necessary to permit essentially all of the fluoride to precipitate in accordance with equation 1; however, less than these amounts can be used to precipitate essentially all of the fluoride when a portion of the precipitate is a compound other than fluorapatite. It has, for example, been unexpectedly found that essentially all fluoride can be precipitated when a portion of the precipitate is a form of calcium fluoride.

Sufficient precipitation of fluorapatite formed from calcium, phosphate and fluoride in aqueous solution is dependent upon the pH of the solution. The final pH of the solution should preferably be above about 6.0 and most preferably be above 6.5 since the solubility of fluorapatite becomes appreciable at a lower pH. In addition, the pH of the solution should be below about 11.5 since at higher pH hydroxyapatite having the formula $Ca_5(PO_4)_3OH$ is preferentially formed rather than fluorapatite. A pH below about 9.0 is even more preferred since very little hydroxyapatite is formed at that pH.

When excess available calcium in the form of calcium ion is present, i.e. in excess of 5 moles of calcium for each mole of fluoride, even more fluoride is removed as fluorapatite due to the common ion effect of the excess calcium ions and the rate of precipitation is increased. In addition, the presence of excess available calcium can reduce the requirement for available phosphate since the excess calcium causes a reduction of initial fluoride by precipitating it as calcium fluoride which does not redissolve rapidly enough to prevent further reduction in fluoride by precipitation as fluorapatite. It has, however, been found that when excess calcium is used for initial fluoride reduction, the precipitate should desirably be removed as soon as the concentration of fluoride is sufficiently low to prevent a possible subsequent increase in fluoride by later dissolving of precipitated calcium fluoride. When a significant amount of fluoride, i.e., about 8 weight percent of the fluoride initially present in the waste water, is precipitated as fluorapatite, the precipitate need not be rapidly removed since the precipitated fluorapatite seems to inhibit the redissolving of precipitated calcium fluoride.

When sufficient excess calcium ion is present and there is sufficient available phosphate to prevent the formation of a permanent calcium fluoride precipitate, i.e., in excess of 3 moles of available phosphate per mole of fluoride, the fluoride concentration in the waste water can be reduced to below 1 part per million and even below about 0.1 part per million.

Available calcium in the waste water may be originally present or may be added in the form of a calcium composition which provides available calcium, i.e., dissociable calcium compositions. Examples of such dissociable calcium compounds include calcium chloride, calcium hydroxide and calcium carbonate. The calcium hydroxide, $Ca(OH)_2$, can be added to the waste water either in the form of solid calcium hydroxide or in the form of a calcium composition which will form calcium hydroxide upon its addition to the water. An example of such a calcium compound which will form calcium hydroxide upon its addition is calcium oxide. When the waste water is acidic, calcium ions can be provided by the effect of acid upon calcium carbonate which release carbon dioxide and forms a calcium salt. The most common source of calcium ions in waste water is generally provided by calcium hydroxide in the form of lime.

As previously discussed, sufficient available phosphate is present in or added to the waste water and is preferably in the amount of at least 3 moles of available phosphate for each mole of fluoride. In general, excess amounts of available phosphate are to be avoided since phosphates are expensive and their discharge into the environment is to be avoided. Furthermore, it has been unexpectedly found that excess available phosphate does not substantially further reduce the fluoride over the reduction obtained when only about 3 moles of available phosphate are present per mole of fluoride to be removed.

The most commonly used and most desirable phosphate composition for providing available phosphate is phosphoric acid since its addition generally automatically reduces the pH of the waste water to below about 11.5 which is necessary to avoid the formation of hydroxyapatite rather than fluorapatite. Other phosphate compositions may however be used when steps are taken to be certain that the pH is held below about 11.5. Such other steps for example include the incorporation of buffers or other acids in the phosphate composition to reduce the pH of the waste water. Such buffers or acids may also be added in conjunction with or prior to the incorporation of phosphate in other forms. Usually, the addition of 0 to 5 weight percent of phosphoric acid is more than sufficient to provide the correct mole ratio of phosphate ion and to sufficiently reduce pH of the waste water.

Other acids which can be used to reduce pH in addition to or in place of phosphoric acid include inorganic acids such as hydrochloric, nitric, perchloric and sulfuric acids and organic acids such as acetic, tartaric and citric. In general, the acid which is selected for pH reduction should provide an ion which will not combine with available calcium to form sufficient calcium compound to reduce the level of available calcium in the waste water below the desirable 5 moles for each mole of fluoride present in the waste water.

Subsequent to the addition of phosphate and sufficient acid to obtain a solution having a pH below about 11.5, sufficient base, if needed, is added to the solution to obtain a sufficiently high pH to cause the formation of a precipitate. Insufficient base is added to the solution to raise the pH above about 11.5 since as previously discussed, a pH above about 11.5 will result in the formation of undesirable hydroxyapatite. "Base" as used herein is intended to mean any compound or composition which, when added to an aqueous composition, will result in the formation of hydroxyl ion. The word "acid" as used herein is intended to mean any composition which, when added to an aqueous composition, will cause the formation of hydrogen ion.

Suitable bases for addition to the waste water to raise its pH include any base compound which will not react with calcium and phosphate ions to form a compound which will not convert to fluorapatite. Suitable bases include but are not limited to lime, sodium hydroxide, calcium carbonate, sodium carbonate and sodium bicarbonate. The most desirable base for large volumes of waste water in lime since it is readily available and provides both a source of calcium ion and is particularly suitable for raising the pH to the appropriate level.

After the precipitate forms, the resulting precipitate is maintained in contact with the water until essentially all fluoride is removed, most of which is desirably chemically combined in water insoluble fluorapatite often in conjunction with some calcium fluoride. The required contact time of the precipitate with the waste water varies greatly between about 1 second and about 1 month and is dependent upon seeding, the pH of the waste water and the relative concentrations of available phosphate, available calcium and fluoride. These times vary due to different reaction rates and due to intermediate compositions which may form under varying conditions and which require different time periods to convert to fluorapatite. For example, when concentration of phosphate and calcium is high and at least some seeding is used, the contact time usually varies from about 1 second to about 10 minutes. When concentrations are low and at least some seeding is used, the contact time will usually vary between about 2 minutes to about 2 hours. When seeding is not used, contact time will usually vary from about 30 minutes to about 24 hours. When the pH of the waste water is not in the optimum range, i.e., between about 6.5 to about 9.0, longer contact times will be required than when the pH range is within the optimum range.

Fluorapatite is preferentially formed when fluorapatite is dispersed in the waste water prior to the formation of a precipitate. The dispersed fluorapatite acts as a nucleating agent to cause fluoride to precipitate more rapidly as fluorapatite. Similarly and unexpectedly calcium fluoride acts as a nucleating agent upon which fluorapatite forms.

Desirably, only minor amounts of hydroxyapatite form and most desirably the precipitate is essentially free from hydroxyapatite since hydroxyapatite does not contain fluoride and uses up the available calcium and phosphate needed to form fluorapatite. After all of the fluoride has been removed from the waste water, other precipitates containing calcium and phosphate such as hydroxyapatite may be formed without detrimental effects and such precipitation may in fact be desirable to minimize remaining phosphates in the waste water.

After essentially all fluoride is precipitated from the waste water at least some of which is found in the form of fluorapatite, the precipitate is usually separated from the water and may be treated with acid to form calcium fluoride and water soluble phosphate composition. Such acidification is desirably effected at a pH below about 4, preferrably below about 3.5 and most preferrably below about 3.2. The acidification pH is generally above about 1.5, desirably above about 2 and more desirably above about 2.4 since lower pH results in dissolving calcium fluoride by forming soluble $HF_2-$. The optimum acidification pH is between about 2.4 and 3.2.

The water soluble phosphate composition obtained from acidifying fluorapatite may be dissolved in aqueous liquid to remove water insoluble calcium fluoride. The dissolved phosphate composition obtained from the fluorapatite may be then continuously recycled to additional waste water containing fluoride to provide at least a portion and desirably most of the required available phosphate. Furthermore, water soluble calcium composition may be but is not necessarily simultaneously formed upon acidification of the fluorapatite and may be simultaneously dissolved with the phosphate composition in an aqueous liquid to remove it from water insoluble calcium fluoride and continuously recycled with the water soluble phosphate composition to additional waste water containing fluoride to provide at least a portion of the required available calcium.

For example, when fluorapatite is treated with sulfuric acid water soluble phosphoric acid and water insoluble calcium sulfate are obtained and when fluorapatite is treated with hydrochloric acid water soluble phosphoric acid and water soluble, calcium chloride are obtained. Nitric and perchloric are also suitable acids.

All of the precipitated fluorapatite need not be treated with acid and a portion of the untreated fluorapatite can be dispersed in the additional waste water prior to the formation of further precipitate. Such dispersion is desirable since the fluorapatite acts as a nucleating agent to cause fluoride to precipitate more rapidly as fluorapatite. It is further believed that the dispersed fluorapatite causes direct precipitation of fluorapatite thus avoiding intermediate compositions which subsequently convert to fluorapatite. Similarly, a portion of precipitatee calcium fluoride can be recycled as a nucleating agent alone or combined with the fluorapatite.

Although it is not essential, the use of excessive phosphate composition in the process of the invention can be avoided by pretreating waste water containing an excess of about 8 parts per million of fluoride ion with calcium ion to precipitate the excess fluoride ion as calcium fluoride. The pretreated waste water is then further treated with calcium ion and phosphate ion in accordance with the process of the invention. It has been unexpectedly found that precipitated calcium fluoride need not be removed prior to treatment with phosphate and calcium to remove remaining fluoride as fluorapatite and in fact, it has been unexpectedly found that the presence of the calcium fluoride accelerates precipitation of fluorapatite. After precipitation of remaining fluoride as fluorapatite, when calcium fluoride is present, the precipitate should be removed to prevent subsequent increase in fluoride which sometimes results from redissolving of calcium fluoride.

The process of the invention can be made a continuous process for purifying waste water containing fluoride. As a first step in the continuous process sufficient calcium composition is continuously added to a stream of the waste water to provide at least 5 moles of available calcium in the waste water for each mole of fluoride in the waste water.

Sufficient phosphate composition to obtain at least 3 moles of available phosphate for each mole of fluoride is then continuously added to the stream. The phosphate composition is desirably selected to provide a pH in the waste water of from about 6.0 to about 11.5 after its addition and more desirably from about 6.5 to about 9.0 after its addition. If the phosphate composition is not so selected, sufficient acid or base is added in conjunction with the phosphate composition to provide waste water within the about 6.0 to about 11.5 range and more desirably within the about 6.5 to about 9.0 pH range.

As the precipitation reaction proceeds, the pH drops and may drop to a level which results in undesirably high solubility of the precipitate. After precipitation the most desirable end pH is between about 6.5 to about 9 which if necessary is obtained by at least one upward pH adjustment with base.

Essentially simultaneously with the addition of phosphate composition, a compound selected from fluorapatite, calcium fluoride and mixtures thereof is slurried into the waste water stream as a nucleating agent. The nucleating agent is most preferably fluorapatite. A precipitate is then permitted to form which contains essentially all fluoride present in the waste water. The fluoride containing precipitate is then separated from the waste water and at least a portion of the precipitate is acidified and the resulting phosphate containing liquid is recycled as at least a portion of the phosphate composition.

A portion of the calcium ion which is added to the waste water stream is desirably added by dissolving lime in the waste water stream. In addition, at least a portion of the calcium ion may be added as a water soluble calcium salt in conjunction with or prior to the addition of the phosphate composition. Such water soluble calcium salt can be obtained by recycling water soluble calcium composition which is composition which is obtained at the time that the precipitate is acidified. The precipitate may be acidified with any suitable acid which will form water soluble phosphate and calcium compounds. The most desirable acids for such acidification are hydrochloric acid and sulfuric acid.

The precipitate which forms in a waste water stream as a result of either the continuous or batch process of the invention may be removed by passing the waste water through a settling tank having sufficient residence time to permit the precipitate to be removed from the waste water by settling or alternatively the waste water may be passed through a filter or centrifuge to remove the precipitate.

Fluorapatite or calcium fluoride which is slurried into the waste water as a nucleating agent may be obtained by slurrying a portion of the precipitate which forms as a result of the process since the precipitate contains fluorapatite and usually some calcium fluoride.

Calcium fluoride which is slurried into the waste water as nucleating agent may be obtained as a portion of the precipitate which forms from the process when the waste water contains more than about eight parts per million of fluoride and sufficient calcium composition is added to exceed the solubility limits of calcium fluoride.

The following examples serve to illustrate the process of the invention and are not to be considered a limitation thereof. All parts and percentages in the following examples are by weight.

EXAMPLE 1

55 ml of a 0.0526 molar calcium acetate solution, 30 ml of a 0.0526 molar phosphoric acid solution and 10 ml of a 0.0526 sodium fluoride solution are mixed and sufficient water is immediately added to raise the volume to 100 ml which results in a 0.00526 molar (100 parts per million) fluoride solution having a molar ratio of calcium to phosphate to fluoride of 5.5 to 3 to 1. The pH is then adjusted to between 7.5 and 8 with 0.2 molar sodium hydroxide and allowed to stand for about 2 hours. The solution is then filtered to remove the precipitate. The filtrate is tested for fluoride concentration by means of a fluoride ion specific electrode and found to contain 0.2 parts per million (ppm) fluoride.

This example clearly illustrates the superior removal of fluoride from the water in accordance with the process of the invention.

EXAMPLES 2 through 5

The procedure of Example 1 is followed except varying volumes of the calcium acetate and phosphoric acid solutions are added to vary the molar ratio.

TABLE I

| | Molar ratio $Ca^{++}$ to $PO_4^=$ to $F^-$ | Final fluoride concentration in ppm |
|---|---|---|
| 2. | 1 to 0 to 1 | 9.6 ppm $F^-$ |
| 3. | 2.5 to 1 to 1 | 8.3 ppm $F^-$ |
| 4. | 3.2 to 1 to 1 | 1.5 ppm $F^-$ |
| 5. | 5.5 to 0.6 to 1 | 5.0 ppm $F^-$ |

When compared with Example 1 these examples show that the most desirable molar ratio of calcium to phosphate to fluoride is 5 to 3 to 1 and further show that a satisfactory result can be obtained when there is a molar ratio of about 3 to 1 to 1 and that calcium and phosphate concentrations should desirably not be dropped below those levels.

EXAMPLE 6

Sufficient calcium and phosphate is added to a 0.00032 molar (6.2 ppm) fluoride solution to obtain a 0.0158 molar calcium ion concentration and a 0.00790 phosphate ion concentration. This solution represents a molar ratio of calcium to phosphate to fluoride of about 48 to 29 to 1. The resulting solution adjusted to a pH of between 8.1 and 8.6 with 0.2M NaOH and is allowed to stand for 20 hours and is filtered to remove precipitate. The filtrate is analyzed for fluoride concentration with a fluoride ion specific electrode and is found to contain 0.008 parts per million fluoride.

This example demonstrates that when an appropriate substantial excess over 5 moles of calcium per mole of fluoride and an appropriate substantial excess over 3 moles of phosphate per mole of fluoride is incorporated into a solution containing fluoride, a precipitate will form which can reduce fluoride concentration in the solution to below 0.01 parts per million.

EXAMPLE 7

The procedure of Example 6 is followed except the molar calcium ion concentration is 0.00526 and the molar phosphate ion concentration is 0.00158 which represents a molar ratio of calcium to phosphate to fluoride of 16 to 5 to 1. The filtrate is found to have a fluoride ion concentration of 0.056 ppm which demonstrates a slight increase in residual fluoride as the molar ratio approaches the theoretical fluorapatite ratio of 5 to 3 to 1 but which still results in a fluoride concentration of less than 0.1 parts per million.

EXAMPLE 8

The procedure of Example 6 is followed except that the initial fluoride concentration is 0.000737 molar (14 ppm), the calcium concentration is 0.0153 molar and the phosphate concentration is 0.00316 which represents a molar ratio of calcium to phosphate to fluoride of 20 to 4.2 to 1, the pH is adjusted to 7 and the solution is filered after 24 hours. The filtrate is found to contain 0.46 ppm fluoride.

EXAMPLE 9

The procedure of Example 8 is followed except that the molar ratio is 17 to 2 to 1 of calcium to phosphate to fluoride. The filtrate is found to contain 2.2 ppm fluoride. This example illustrates that as the molar ratio of phosphate to fluoride becomes lower than 3 to 1, a residual fluoride concentration can be obtained which is still below 3 parts per million but that there is a significant increase in residual fluoride when compared with the situation where the molar ratio of phosphate to fluoride is higher than 3 to 1.

EXAMPLE 10

The procedure of Example 6 is followed except the molar concentration of calcium is 0.0184 and the molar concentration of phosphate is 0.00947 representing a molar ratio of calcium to phosphate to fluoride of 56 to 28 to 1. The filtrate is found to contain 0.018 ppm fluoride.

EXAMPLE 11

A solution is prepared containing a 0.0153 molar concentration of calcium, a 0.00316 molar concentration of phosphate and a 0.000274 molar (5.2 ppm) concentration of fluoride at a pH below 6.

The pH is then adjusted to 6 with 0.2M NaOH. No precipitate forms after a period of 8 hours when no seeding is used.

EXAMPLES 12 through 20

The procedure of Example 11 is followed except the pH is adjusted to various higher levels which causes the formation of a precipitate and the fluoride concentration is measured after about 8 hours. The results are in Table II below.

TABLE II

| Example | pH | ppm $F^-$ found |
|---|---|---|
| 12 | 6.50 | 0.04 |
| 13 | 7.00 | 0.02 |
| 14 | 7.50 | 0.05 |
| 15 | 8.10 | 0.07 |
| 16 | 8.60 | 3.4 |
| 17 | 9.10 | 3.2 |
| 18 | 9.60 | 3.2 |
| 19 | 10.20 | 3.2 |
| 20 | 10.60 | 4.8 |

This example shows that over a period of about 8 hours when no seeding is used, the most desirable pH range is between about 6.5 and about 8.5

EXAMPLE 21

A solution is prepared at a pH below 6, containing a 0.000737 molar (14 ppm) fluoride concentration, a 0.00316 molar phosphate concentration and a 0.00626 calcium concentration. The pH is then adjusted to 6.6 with 0.2 M NaOH. The fluoride concentration of the filtrate is measured after the expriation of 5 hours and is found to contain 3.6 parts per million fluoride and after 35 hours is found to contain 0.46 ppm fluoride.

EXAMPLE 22 through 26

The procedure of Example 21 is followed except the pH is adjusted to various levels. The results are set forth in Table III below;

TABLE III

| Example | pH | $F^-$ after 5 hours | $F^-$ after 35 hours |
|---|---|---|---|
| 22 | 6.00 | No precipitate | No precipitate |
| 23 | 7.00 | 1.2 ppm | 0.1 ppm |
| 24 | 7.5 | 1.2 ppm | 0.6 ppm |
| 25 | 8.0 | 1.5 ppm | 0.3 ppm |
| 26 | 8.6 | 1.8 ppm | 0.3 ppm |

Examples 21 through 26 show that waiting a longer period for completion of fluoride removal results in lower residual fluoride with the pH range 6.6 to 8.6.

EXAMPLE 27

A solution is prepared which contains a 0.000368 molar (7 ppm) fluoride ion concentration, a 0.00204 molar phosphate ion concentration and a 0.0134 molar calcium ion concentration. The pH is then immediately adjusted to 6.25 and 0.000737 millimoles of solid fluorapatite is immediately slurried into the solution. The solution is then immediately filtered and the filtrate is measured for fluoride ion. The results are in Table IV.

EXAMPLES 28 through 53

The procedure of Example 27 is followed except the initial pH and the elapsed time before filtering are varied. The pH is adjusted upwardly to within about 1 pH point above the initial pH with 0.2 M NaOH when the pH drops to from about 5 to 6 due to the precipitation reaction. The pH is not adjusted upwardly until the pH drops from about 5 to 6 since the reaction continues down to pH 5 to 6. A pH adjustment is indicated in the Table by an asterisk.

TABLE IV

| Example | Time in minutes between slurrying and filtering | Initial pH | ppm $F^-$ |
|---|---|---|---|
| 27 | immediate | 6.25 | 2.2 |
| 28 | 1 | 6.25 | 1.0 |
| 29 | 3 | 6.25 | 0.9 |
| 30 | 6 | 6.25 | 0.26* |
| 31 | 8 | 6.25 | 0.05* |
| 32 | 15 | 6.25 | 0.01* |

TABLE IV-continued

| Example | Time in minutes between slurrying and filtering | Initial pH | ppm F⁻ |
|---|---|---|---|
| 33 | immediate | 6.80 | 1.5 |
| 34 | 1 | 6.80 | 0.8 |
| 35 | 5 | 6.80 | 0.5 |
| 36 | 7 | 6.80 | 0.4* |
| 37 | 10 | 6.80 | 0.1 |
| 38 | 15 | 6.80 | 0.05 |
| 39 | 20 | 6.80 | 0.05 |
| 40 | 1 double seed added | 6.80 | 0.5 |
| 41 | 3 double seed added | 6.80 | 0.3 |
| 42 | 4 double seed added | 6.80 | 0.2 |
| 43 | 7 double seed added | 6.80 | 0.1* |
| 44 | 9 double seed added | 6.80 | 0.03* |
| 45 | 1 | 7.00 | 4.6 |
| 46 | 3 | 7.00 | 2.6 |
| 47 | 9 | 7.00 | 1.2 |
| 48 | 15 | 7.00 | 0.7 |
| 49 | 30 | 7.00 | 0.07* |
| 50 | 130 | 7.00 | 0.02 |
| 51 | 2 | 8.10 | 4.6 |
| 52 | 15 | 8.10 | 3.2 |
| 53 | 207 | 8.10 | 1.0 |
| 54 | 327 | 8.10 | 0.18 |
| 55 | 2 | 8.60 | 4.6 |
| 56 | 30 | 8.60 | 4.3 |
| 57 | 353 | 8.60 | 1.2 |
| 58 | 493 | 8.60 | 0.4 |

Examples 23 through 58 show that seeding with fluorapatite greatly increases the rate at which fluoride is removed from solution particularly at an initial pH range of from 6.25 to 7.00. A comparison of Examples 33 through 44 shows that increased seeding even further increases the rate of fluoride removal. These examples also show that the pH of the solution drops as fluoride is removed from solution in a precipitate.

EXAMPLE 59

A solution containing a 0.000545 molar (10 ppm) fluoride ion concentration, a 0.00647 molar calcium ion concentration and a 0.00316 molar phosphate ion concentration, is allowed to stand for several days at a pH of 6.6 without forming a precipitate. 0.000247 moles of calcium fluoride are then slurried into the solution and after 13 minutes the fluoride ion concentration is found to be reduced from 10 ppm to 5.6 ppm. The pH is then raised to about 7 and after only 2.5 more minutes, the fluoride ion concentration is found to be 2.2 ppm.

This example illustrates that calcium fluoride acts to accelerate the removal of fluoride as precipitated fluorapatite and does not seem to substantially interfere with fluoride removal.

What is claimed is:

1. A continuous process for purifying water containing fluoride which comprises:
   (a) continuously adding sufficient calcium composition to a stream of water to provide at least five moles of available calcium in said water for each mole of fluoride in said water;
   (b) continuously adding sufficient phosphate composition to said stream, said phosphate composition being selected to provide a pH in the water of from about 6.0 to about 11.5 after its addition;
   (c) essentially similtaneously with the addition of said phosphate composition slurrying a seeding composition selected from the group consisting of fluorapatite, calcium fluoride and mixtures thereof into said stream; and
   (d) permitting a precipitate to form which comtains essentially all fluoride which was present in the water.

2. The process of claim 1 wherein sufficient phosphate composition is added to provide at least 3 moles of available phosphate for each mole of fluoride.

3. The process of claim 1 wheren said available calcium is calcium ion, said available phosphate is phosphate ion, and said fluoride is fluoride ion.

4. The process of claim 1 wherein the fluoride containing precipitate is separated from the water.

5. The process of claim 4 wherein at least a portion of the fluoride containing precipitate is acidified and the resulting phosphate containing liquid is recycled as at least a portion of said phosphate composition.

6. The process of claim 5 wherein said acidification provides at least some water soluble calcium composition which is recycled with the phosphate composition.

7. The process of claim 5 wherein said precipitate is acidified with hydrochloric acid.

8. The process of claim 4 wherein said water is passed through a settling tank having sufficient residence time to permit said precipitate to be removed from the water by settling.

9. The process of claim 8 wherein a portion of the precipitate is recycled to the process as seeding composition.

10. The process of claim 4 wherein said water is passed through a filter to remove said precipitate.

11. The process of claim 4 wherein said precipitate is removed by a centrifuge.

12. The process of claim 1 wherein at least a portion of said available calcium is added by dissolving lime in the water.

13. The process of claim 1 wherein at least a portion of the calcium ion is added as a water soluble calcium salt in conjunction with the addition of the phosphate composition.

14. The process of claim 1 wherein the end pH after precipitation is between about 6.5 and about 9.0.

15. The process of claim 14 wherein at least 1 upward pH adjustment is made with base to obtain said end pH.

16. A continuous process for purifying water containing fluoride and at least five moles of available calcium for each mole of fluoride which comprises:
   (a) continuously adding phosphate composition to a stream of said water to provide sufficient available phosphate in said water;
   (b) adding from 0 to about 5 weight percent acid to said water to obtain a water pH of from about 6.0 to about 11.5;
   (c) essentially simultaneously with obtaining said pH of from about 6.0 to about 11.5 slurrying a seeding composition into said stream, said seeding composition being selected from the group consisting of fluorapatite, calcium fluoride and mixtures thereof; and
   (d) permitting a precipitate to form which contains essentially all fluoride which was present in the water.

17. The process of claim 16 wherein sufficient phosphate is added to provide at least 3 moles of available phosphate in said water for each mole of fluoride.

18. The process of claim 17 wherein said pH is from about 6.5 to about 9.0.

19. The process of claim 16 wherein said available calcium is calcium ion, said available phosphate is phosphate ion and said fluoride is fluoride ion.

20. The process of claim 16 wherein said precipitate comprises fluorapatite.

21. The process of claim 20 wherein said precipitate comprises a mixture of calcium fluoride and fluorapatite.

22. The process of claim 16 wherein said precipitate is removed from the water.

23. The process of claim 16 wherein at least a portion of said removed precipitate is treated with acid to obtain a water soluble phosphate composition.

24. The process of claim 23 wherein said water soluble phosphate composition obtained by said acid treatment is recycled to provide at least a portion of said available phosphate.

25. The process of claim 24 wherein water soluble calcium composition is simultaneously formed with said water soluble phosphate composition by said acid treatment, said water soluble calcium composition being recycled with said water soluble phosphate composition to provide at least a portion of said available calcium.

26. The process of claim 16 wherein said water is passed through a settling tank having sufficient residence time to permit said precipitate to be removed from the water by settling.

27. The process of claim 16 wherein said water is passed through a filter to remove said precipitate.

28. The process of claim 16 wherein said precipitate is removed by a centrifuge.

29. The process of claim 16 wherein the end pH after precipitation is between about 6.5 and about 9.0.

30. The process of claim 29 wherein at least 1 upward pH adjustment is made with base to obtain said end pH.

31. The process of claim 30 wherein said acid used to obtain a pH of from about 6.0 to about 11.5 and said phosphate composition are the same and are phosphoric acid.

32. In a process for purifying water containing fluoride by providing sufficient available calcium and sufficient available phosphate to precipitate at least a portion of said fluoride as fluorapatite, the improvement which comprises dispersing a seeding composition selected from the group consisting of fluorapatite, calcium fluoride and mixtures thereof into said water prior to the formation of a precipitate, said seeding composition acting as a nucleating agent to cause fluoride to precipitate more rapidly as fluorapatite.

33. A continuous process for purifying water containing fluoride which comprises:

(a) continuously adding sufficient calcium composition to a stream of water to provide at least 5 moles of available calcium in said water for each mole of fluoride in said water;

(b) continuously adding sufficient phosphate composition to said stream, said phosphate composition being selected to provide a pH in the water of from about 6.0 to about 11.5 after its addition;

(c) essentially, simultaneously with the addition of the phosphate composition, slurrying a fluorapatite seeding composition into said stream;

(d) permitting a precipitate to form which contains essentially all fluoride which was present in the water.

34. The process of claim 33 wherein said precipitate comprises fluorapatite and a portion of the precipitate is recycled to the process as seeding composition.

35. A continuous process for purifying water containing fluoride and at least 5 moles of available calcium for each mole of fluoride which comprises:

(a) continuously adding phosphate composition to a stream of said water to provide sufficient available phosphate in said water to provide at least 3 moles of available phosphate in said water for each mole of fluoride;

(b) adding from about 0 to about 5 weight percent acid to said water to obtain a water pH of from about 6.5 to about 9.0;

(c) essentially, simultaneously with obtaining said pH of from about 6.5 to about 9.0, slurrying a fluorapatite seeding composition into said stream; and (d) permitting a precipitate to form which contains essentially all fluoride which was present in the water.

36. The process of claim 35 wherein said precipitate comprises fluorapatite and at least a portion of said precipitate is removed from the water and recycled as seeding composition.

37. In a process for purifying water containing fluoride by providing sufficient available calcium and sufficient available phosphate to precipitate at least a portion of said fluoride as fluorapatite, the improvement which comprises dispersing a fluorapatite seeding composition into said water prior to the formation of a precipitate, said seeding composition acting as a nucleating agent to cause fluoride to precipitate more rapidly as fluorapatite.

* * * * *